(12) United States Patent
Jung et al.

(10) Patent No.: US 7,376,691 B2
(45) Date of Patent: May 20, 2008

(54) ARITHMETIC AND LOGIC UNIT USING HALF ADDER

(75) Inventors: Ku Rak Jung, Gwangju si (KR); Jun Hee Kang, Gyeonggi-do (KR); Alex F. Kirichenko, Elmsford, NY (US); Saad Sarwana, Elmsford, NY (US)

(73) Assignee: Industry-Academic Cooperation Foundation University of Incheon (KR)

( * ) Notice: Subject to any disclaimer, the term of this patent is extended or adjusted under 35 U.S.C. 154(b) by 783 days.

(21) Appl. No.: 10/849,665

(22) Filed: May 20, 2004

(65) Prior Publication Data

US 2005/0235027 A1 Oct. 20, 2005

(30) Foreign Application Priority Data

Apr. 16, 2004 (KR) ............ 10-2004-0026148

(51) Int. Cl.
*G06F 7/50* (2006.01)
(52) U.S. Cl. ............................................. 708/670
(58) Field of Classification Search ............... 708/670
See application file for complete search history.

(56) References Cited

U.S. PATENT DOCUMENTS 4,330,841 A * 5/1982 Yamada et al. ............ 708/700

6,486,694 B1 11/2002 Kirichenko ............... 326/3
7,209,381 B2 * 4/2007 Johnson .................... 365/158

* cited by examiner

*Primary Examiner*—Tan V. Mai
(74) *Attorney, Agent, or Firm*—St. Onge Steward Johnston & Reens LLC

(57) ABSTRACT

The present invention discloses an ALU (Arithmetic Logic Unit) that can be operated as an OR gate, an AND gate, an adder gate and an exclusive OR gate using a half adder that uses a superconductor rapid single flux quantum logic device. The ALU using a half adder includes a half adder using a superconductor rapid single flux quantum logic device as a logic circuit, and a switching unit that has input ports respectively connected to a sum output port and a carry output port of the half adder and is operated as an OR gate, an AND gate, an adder gate and an exclusive OR gate using output signals of the half adder. The switching unit includes a first switch having an input port connected to the sum output port of the half adder, a second switch having an input port connected to the carry output port of the half adder and an output port connected to an output port of the first switch, and a third switch having an input port connected to the carry output port of the half adder.

2 Claims, 5 Drawing Sheets

ARITHMETIC AND LOGIC UNIT USING HALF ADDER

This application claims priority of pending Korean Patent Application 2004-26148 filed Apr. 16, 2004.

FIELD OF THE INVENTION

The present invention relates to an arithmetic and logic unit (ALU), and more particularly, to a high-performance ALU that can be operated as an OR gate, an AND gate, an adder gate and an exclusive OR gate using a superconductor rapid single flux quantum logic device as a half adder.

BACKGROUND OF THE RELATED ART

Development of information communication technology increasingly requires improved performances of computers and microprocessors used for the technical fields.

The performances of computers and microprocessors are determined by the performance of a central processing unit (CPU). Especially, the performance of an ALU constructing the CPU is very important.

FIG. 1 shows a structure of an ALU generally used. As shown in FIG. 1, the ALU is composed of a combination of semiconductor logic circuits including an exclusive OR gate 11, an AND gate 12, an OR gate 13, a full adder 14 and a multiplexer 15. The logic circuits determine digital output values based on to voltage states.

However, the ALU including the semiconductor logic circuits has a relatively low operating speed. To significantly improve the performance of the ALU, it is more preferable to determine a digital value using a voltage pulse than to determine the digital value according to a voltage state.

There has been proposed a superconductor rapid single flux quantum logic device as a logic circuit that determines a digital value using a voltage pulse. A half adder or a T flip-flop using the superconductor rapid single flux quantum logic device has been also proposed.

FIG. 2 shows a circuit configuration of a conventional half adder using the superconductor rapid single flux quantum logic device as a logic circuit. The half adder is rapidly operated at an operating speed of approximately several tens GHz. In FIG. 2, circuit components denoted by J represent Josephson junctions.

Josephson junction is obtained by weakly combining two superconductors with each other. When an input signal is applied to the Josephson junction, a current of more than a predetermined level is flowed through the Josephson junction to generate a very short voltage pulse of several ps. Accordingly, a digital logic gate having a high operating speed of several tens to hundreds GHz can be constructed using the Josephson junction.

In addition to the aforementioned half adder, a T flip-flop using the superconductor rapid single flux quantum logic device as a logic circuit has been proposed. This T flip-flop is operated very rapidly at an operation speed of 770 GHz.

Recently, there are attempts to utilize the half adder using the superconductor rapid single flux quantum logic device as a logic circuit for ALUs.

SUMMARY OF THE INVENTION

Accordingly, the present invention has been made in view of the aforementioned technical trends, and it is an object of the present invention is to provide a high-performance ALU that can be operated as an OR gate, an AND gate, an adder gate and an exclusive OR gate using a half adder that uses a superconductor rapid single flux quantum logic device as a logic circuit.

To accomplish the above object, according to the present invention, there is provided an ALU using a half adder comprising a half adder using a superconductor rapid single flux quantum logic device as a logic circuit, and a switching unit that has input ports respectively connected to a sum output port and a carry output port of the half adder and is operated as an OR gate, an AND gate, an adder gate and an exclusive OR gate using output signals of the half adder. The switching unit includes a first switch having an input port connected to the sum output port of the half adder, a second switch having an input port connected to the carry output port of the half adder and an output port connected to an output port of the first switch, and a third switch having an input port connected to the carry output port of the half adder.

BRIEF DESCRIPTION OF DRAWINGS

The above and other objects, features and advantages of the present invention will be apparent from the following detailed description of the preferred embodiments of the invention in conjunction with the accompanying drawings, in which.

DETAILED DESCRIPTION OF PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein. It will be appreciated that various modifications, variations or equivalent arrangements which may occur to those skilled in the art should be considered to be within the scope of the invention.

Figure 1:
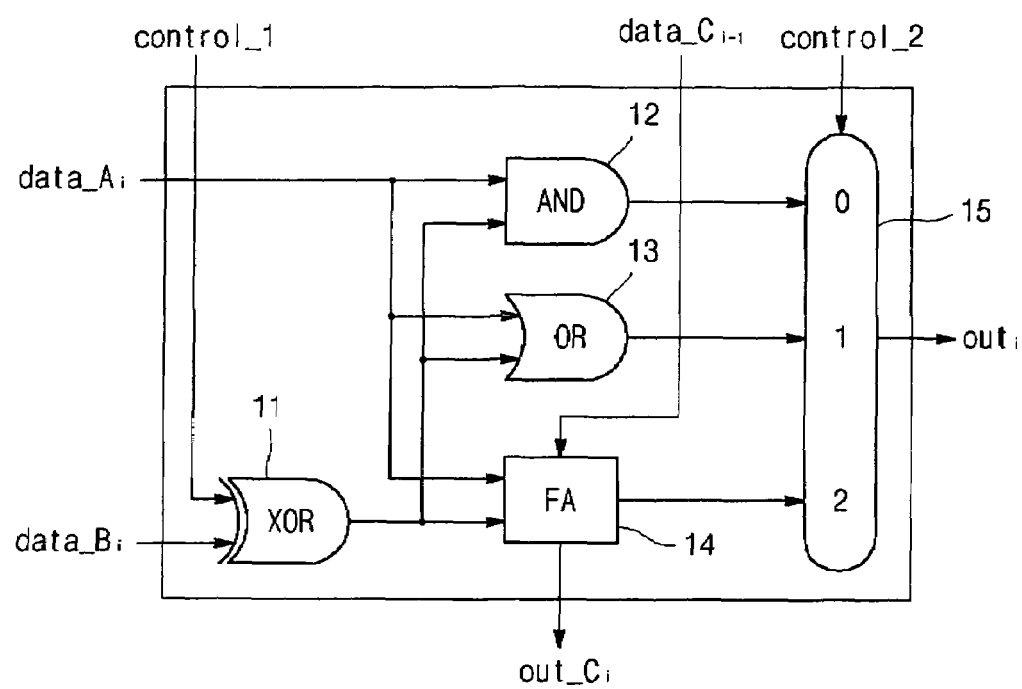
FIG. 1 shows a structure of an ALU generally used.
Figure 2:
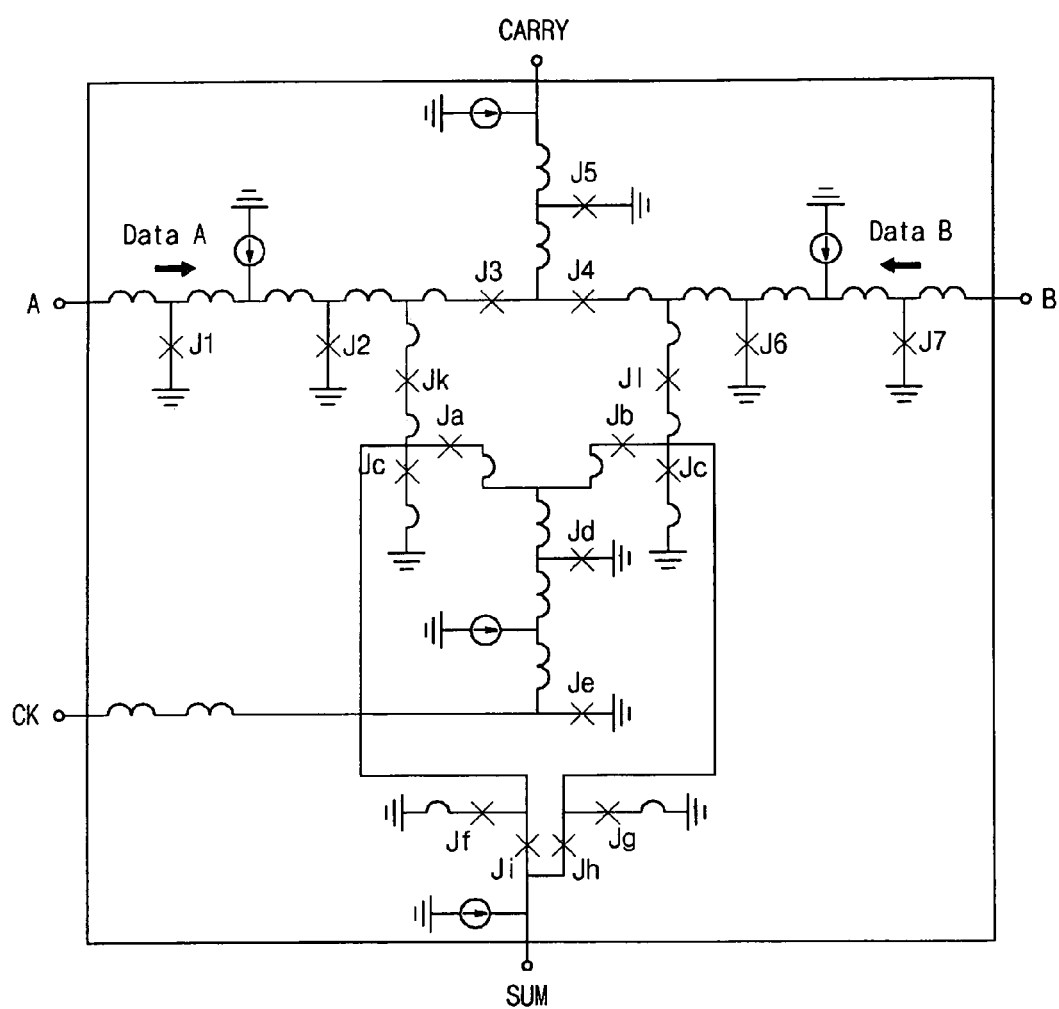
FIG. 2 shows a circuit configuration of a half adder using a superconductor rapid single flux quantum logic device as a logic circuit.
Figure 3:
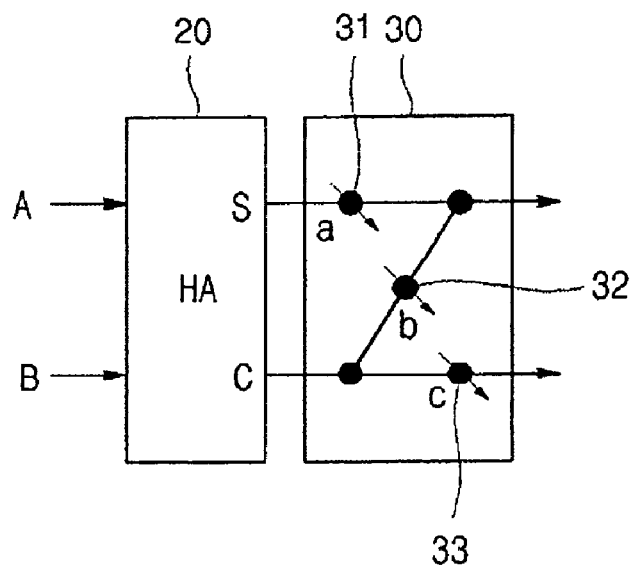
FIG. 3 shows a configuration of an ALU using a half adder according to an embodiment of the present invention.

FIG. 3 shows a configuration of an ALU using a half adder according to an embodiment of the present invention. Referring to FIG. 3, the ALU includes a half adder 20 that uses a superconductor rapid single flux quantum logic device as a logic circuit, and a switching unit 30 that has input ports respectively connected to a sum output port S and a carry output port C of the half adder 20. The ALU is operated as an OR gate, an AND gate, an adder or an exclusive OR gate using output signals of the half adder 20. The switching unit 30 includes a first switch 31 having an input port connected to the sum output port S of the half adder 20, a second switch 32 having an input port connected to the carry output port C of the half adder 20 and an output port connected to an output port of the first switch 31, and a third switch 33 having an input port connected to the carry output port C of the half adder 20.

Figure 4:
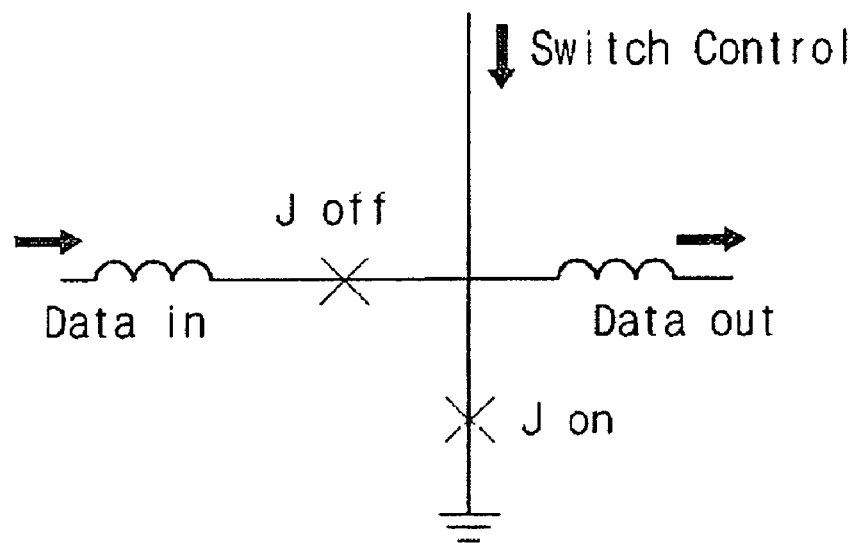
FIG. 4 shows a configuration of a switch of the ALU of FIG. 3.

FIG. 4 shows a configuration of each of the first, second and third switches shown in FIG. 3. In FIG. 4, circuit elements denoted by J represent Josephson junctions.

The switch shown in FIG. 4 is closed when a current magnitude of a control signal Switch Control is larger than a predetermined value determined by values of the circuit elements. The switch is opened when the current magnitude is less than the predetermined value. When an input signal is applied to the switch through an input inductor, a first Josephson junction Joff does not generate a voltage pulse when the switch is opened and a second Josephson junction Jon generates a voltage pulse when the switch is closed. The voltage pulse is output through an output inductor.

The operation of the ALU using the half adder according to the present invention will be explained hereinafter.

The ALU using the half adder 20 shown in FIG. 3 is operated as an OR gate, an AND gate, an adder gate or an exclusive OR gate on the basis of states of the first, second and third switches 31, 32 and 33 of the switching unit 30. Specifically, the ALU is operated as an OR gate when the first and second switches 31 and 32 are closed and the third switch 33 is opened. The ALU is operated as an AND gate when the second switch 32 is closed and the first and third switches 31 and 33 are opened. The ALU is operated as an adder gate when the first and third switches 31 and 33 are closed and the second switch 32 is opened. The ALU is operated as an exclusive OR gate when the first switch 31 is closed and the second and third switches 32 and 33 are opened.

Figure 5:
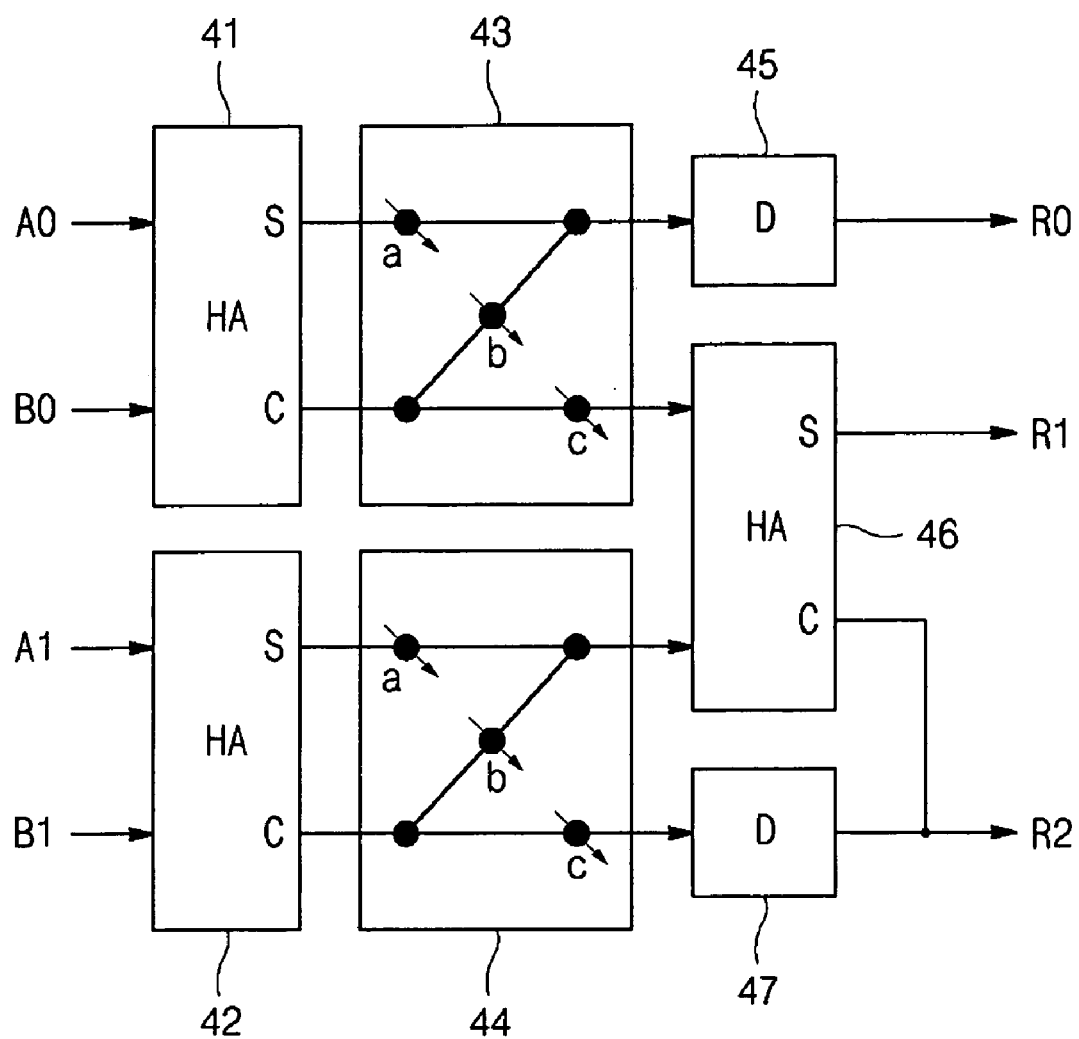
FIG. 5 shows a configuration of a 2-bit ALU employing the ALU using a half adder according to an embodiment of the present invention.

A 2-bit ALU as shown in FIG. 5 can be constructed using the above-described operation characteristic. FIG. 5 shows a configuration of the 2-bit ALU employing the ALU using a half adder according to the present invention. The 2-bit ALU includes three half adders 41, 42 and 43, two switching units 43 and 44, and two D flip-flops 45 and 47. The operation of the 2-bit ALU will be explained hereinafter in detail.

In the case where the 2-bit ALU is set to an OR gate, when two 2-bit inputs, for example, 11 (A1=1, A0=1) and 10 (B1=1, B0=0) are applied to input ports of the 2-bit ALU, ORed results are output through output ports R0 and R1 so that an output value 011 (R2=0, R1=1, R0=1) is obtained. In this case, the output port R2 outputs 0 all the time.

In the case where the 2-bit ALU is set to an AND gate, when two 2-bit inputs, for example, 11 (A1=1, A0=1) and 10 (B1=1, B0=0) are applied to the input ports of the 2-bit ALU, ANDed results are output through the output ports R0 and R1 so that an output value 010 (R2=0, R1=1, R0=0) is obtained. In this case, the output port R2 outputs 0 all the time.

In the case where the 2-bit ALU is set to an adder gate, when two 2-bit inputs, for example, 11 (A1=1, A0=1) and 10 (B1=1, B0=0) are applied to the input ports of the 2-bit ALU, added results are output through the output ports R0 and R1 so that an output value 101 (R2=1, R1=0, R0=1) is obtained.

In the case where the 2-bit ALU is set to an exclusive OR gate, when two 2-bit inputs, for example, 11 (A1=1, A0=1) and 10 (B1=1, B0=0) are applied to the input ports of the 2-bit ALU, exclusive-ORed results are output through the output ports R0 and R1 so that an output value 001 (R2=0, R1=0, R0=1) is obtained. In this case, the output port R2 outputs 0 all the time.

In the meantime, an ALU that can process multiple bits is required for practical uses.

Figure 6:
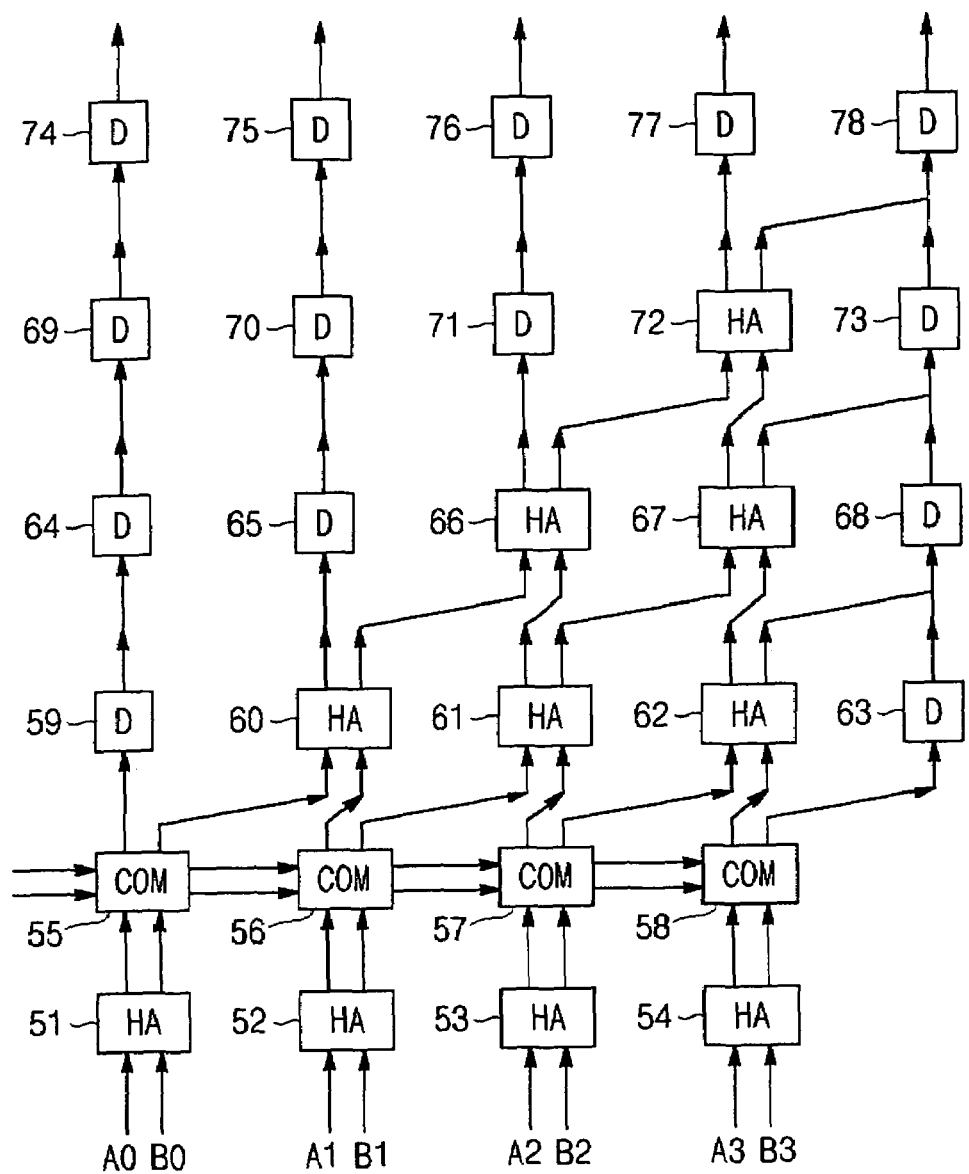
FIG. 6 shows a configuration of a 4-bit ALU employing the ALU using a half adder according to an embodiment of the present invention.

FIG. 6 shows a configuration of a 4-bit ALU employing the ALU using a half adder according to the present invention. The 4-bit ALU includes ten half adders 51, 52, 53, 54, 60, 61, 62, 66, 67 and 72, four switching units 55, 56, 57 and 58, fourteen D flip-flops 59, 63, 64, 65, 68, 69, 70, 71 and 73 through 78.

A maximum operating speed of a circuit that determines a digital value using a voltage pulse is decided according to a signal delay of the voltage pulse. Thus, the operating speed of the circuit is reduced when the circuit uses a global clock used by a circuit that determines a digital value according to a voltage state. Accordingly, the circuit that determines a digital value using a voltage pulse does not require the global pulse.

That is, the 4-bit ALU shown in FIG. 6 can use a local clock because only component circuits arranged in each row are required to be operated in one clock cycle. Accordingly, a signal delay of the voltage pulse is reduced to increase a maximum operating speed of the circuit. Furthermore, the circuit becomes less sensitive to an increase in the number of bits.

The operation of the 4-bit ALU shown in FIG. 6 will be explained hereinafter in detail.

In the case where the 4-bit ALU is set to an OR gate, when two 4-bit inputs for example, 1111 and 1010 are applied to the circuit, an output value 01111 is obtained.

In the case where the 4-bit ALU is set to an AND gate, when two 4-bit inputs, for example, 1111 and 1010 are applied to the circuit, an output value 01010 is obtained.

In the case where the 4-bit ALU is set to an adder gate, when two 4-bit inputs, for example, 1111 and 1010 are applied to the circuit, an output value 11001 is obtained.

In the case where the 4-bit ALU is set to an exclusive OR gate, when two 4-bit inputs, for example, 1111 and 1010 are applied to the circuit, an output value 00101 is obtained.

As described above, the present invention can produce a high-performance ALU that can be operated as an OR gate, an AND gate, an adder and an exclusive OR gate using a half adder that uses a superconductor rapid single flux quantum logic device as a logic circuit.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An arithmetic and logic unit using a half adder, comprising:
   a half adder using a superconductor rapid single flux quantum logic device as a logic circuit; and
   a switching unit that has input ports each connected to a sum output port and a carry output port of the half adder and is operated as an OR gate, an AND gate, an adder gate and an exclusive OR gate using output signals of the half adder,
wherein the switching unit includes
a first switch having an input port connected to the sum output port of the half adder;
a second switch having an input port connected to the carry output port of the half adder and an output port connected to an output port of the first switch; and
a third switch having an input port connected to the carry output port of the half adder.

2. The arithmetic and logic unit as claimed in claim 1, wherein the first, second and third switches include Josephson junctions obtained by weakly combining two superconductors with each other.

* * * * *